(12) United States Patent
Guard et al.

(10) Patent No.: US 9,116,584 B2
(45) Date of Patent: Aug. 25, 2015

(54) DIELECTRIC LAYER FOR TOUCH SENSOR STACK

(75) Inventors: David Brent Guard, Southampton (GB); Matthew Trend, Fareham (GB)

(73) Assignee: Atmel Corporation, San Jose, CA (US)

( * ) Notice: Subject to any disclaimer, the term of this patent is extended or adjusted under 35 U.S.C. 154(b) by 157 days.

(21) Appl. No.: 13/556,805

(22) Filed: Jul. 24, 2012

(65) Prior Publication Data
US 2014/0028569 A1    Jan. 30, 2014

(51) Int. Cl.
*G06F 3/044* (2006.01)

(52) U.S. Cl.
CPC ...... *G06F 3/044* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 4,290,061 A | 9/1981 | Serrano | |
| 5,122,787 A | 6/1992 | Fujita et al. | |
| 5,418,551 A | 5/1995 | Ise | |
| 6,501,529 B1 | 12/2002 | Kurihara | |
| 7,463,246 B2 | 12/2008 | Mackey | |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,134,535 B2 | 3/2012 | Choi | |
| 8,179,381 B2 | 5/2012 | Frey | |
| 8,184,107 B2 | 5/2012 | Lee | |
| 8,217,902 B2 | 7/2012 | Chang | |
| 8,243,027 B2 | 8/2012 | Hotelling | |
| 8,723,824 B2 | 5/2014 | Myers | |
| 2003/0104693 A1 | 6/2003 | Siegel et al. | |
| 2004/0017362 A1 | 1/2004 | Mulligan et al. | |
| 2004/0141096 A1 | 7/2004 | Mai | |
| 2007/0188180 A1 | 8/2007 | Deangelis et al. | |
| 2007/0222762 A1* | 9/2007 | Van Delden et al. | 345/173 |
| 2008/0007533 A1 | 1/2008 | Hotelling | |
| 2008/0062140 A1 | 3/2008 | Hotelling | |
| 2008/0062148 A1 | 3/2008 | Hotelling | |
| 2008/0309635 A1 | 12/2008 | Matsuo | |
| 2009/0315854 A1 | 12/2009 | Matsuo | |
| 2010/0013499 A1 | 1/2010 | Tong et al. | |
| 2010/0182271 A1 | 7/2010 | Krier | |

(Continued)

FOREIGN PATENT DOCUMENTS

| | | |
|---|---|---|
| WO | WO 2011/107666 | 9/2011 |
| WO | WO 2012/129247 | 9/2012 |

OTHER PUBLICATIONS

U.S. Appl. No. 61/454,936, filed Mar. 21, 2011, Myers.

(Continued)

*Primary Examiner* — Adam R Giesy
(74) *Attorney, Agent, or Firm* — Baker Botts L.L.P.

(57) ABSTRACT

In one embodiment, a touch sensor includes a substrate comprising a first surface. The touch sensor further includes a plurality of first electrodes comprising one or more conductive materials on the first surface. The touch sensor further includes a dielectric layer formed over the first electrodes and at least a portion of the first surface. The dielectric layer has a dielectric constant less than or equal to approximately 3.

20 Claims, 2 Drawing Sheets

(56) References Cited

U.S. PATENT DOCUMENTS

| | | |
|---|---|---|
| 2010/0238134 A1 | 9/2010 | Day |
| 2010/0265212 A1* | 10/2010 | Sekiguchi et al. ............ 345/174 |
| 2010/0302202 A1 | 12/2010 | Takeuchi |
| 2011/0102366 A1* | 5/2011 | Juan et al. ..................... 345/174 |
| 2011/0157087 A1* | 6/2011 | Kanehira et al. .............. 345/174 |
| 2011/0181549 A1 | 7/2011 | Hotelling et al. |
| 2011/0210941 A1 | 9/2011 | Reynolds |
| 2011/0227866 A1* | 9/2011 | Kawaguchi et al. .......... 345/174 |
| 2011/0261005 A1 | 10/2011 | Joharapurkar |
| 2011/0267295 A1 | 11/2011 | Noguchi |
| 2011/0267305 A1 | 11/2011 | Shahparnia |
| 2012/0013565 A1 | 1/2012 | Westhues |
| 2012/0050299 A1 | 3/2012 | Mignard et al. |
| 2012/0062511 A1 | 3/2012 | Ishizaki |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0134996 A1 | 5/2013 | Burberry et al. |
| 2013/0194198 A1 | 8/2013 | Guard et al. |
| 2014/0028570 A1 | 1/2014 | Guard |

OTHER PUBLICATIONS

U.S. Appl. No. 61/454,950, filed Mar. 21, 2011, Lynch.

U.S. Appl. No. 61/454,894, filed Mar. 21, 2011, Rothkopf.

Patent Application entitled, "*Thin Dielectric Layer for Touch Sensor Stack*", inventor David Brent Guard et al.; U.S. Appl. No. 13/364,057 (11127FLM), (28 pgs), filed Feb. 1, 2012.

David Brent Guard; U.S. Appl. No. 13/556,968 (12006FLM), Patent Application entitled, "*Dielectric Layer for Touch Sensor Stack*", (31 pgs), filed Jul. 24, 2012.

Guard et al., U.S. Appl. No. 13/364,057, Non-final Office Action, Oct. 16, 2013.

Guard et al., U.S Appl. No. 13/364,057, Response to Non-final Office Action, Feb. 18, 2014.

David B. Guard, U.S. Appl. No. 13/556,968, Non-final Office Action, Apr. 10, 2014.

Guard et al., U.S. Appl. No. 13/364,057, Advisory Action, Aug. 20, 2014.

*RCE Transmittal*, David B. Guard, U.S. Appl. No. 13/364,057, filed Sep. 2, 2014.

David B. Guard, U.S. Appl. No. 13/364,057, Response filed Feb. 3, 2015.

David B. Guard, U.S. Appl. No. 13/556,968, RCE and Amendment filed Feb. 12, 2015.

Guard et al., U.S. Appl. No. 13/364,057, Final Office Action, 25 pages, Apr. 30, 2014.

USPTO Response to Non-Final Office Ation, David B. Guard, U.S. Appl. No. 13/556,968, 10 pages, Jul. 10, 2014.

USPTO Response to Final Office Action Guard et al., U.S. Appl. No. 13/364,057, 10 pages, Jul. 29, 2014.

Guard et al., U.S. Appl. No. 13/364,057, Non-Final Office Action, 23 pages, Oct. 3, 2014.

Guard, U.S. Appl. No. 13/556,968, Final Office Action 8 pages, Sep. 12, 2014.

\* cited by examiner

DIELECTRIC LAYER FOR TOUCH SENSOR STACK

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF SUMMARY

In one embodiment, a touch sensor includes a substrate comprising a first surface. The touch sensor further includes a plurality of first electrodes comprising one or more conductive materials on the first surface. The touch sensor further includes a dielectric layer formed over the first electrodes and at least a portion of the first surface. The dielectric layer has a dielectric constant less than or equal to approximately 3.

DESCRIPTION OF EXAMPLE EMBODIMENTS

Figure 1:
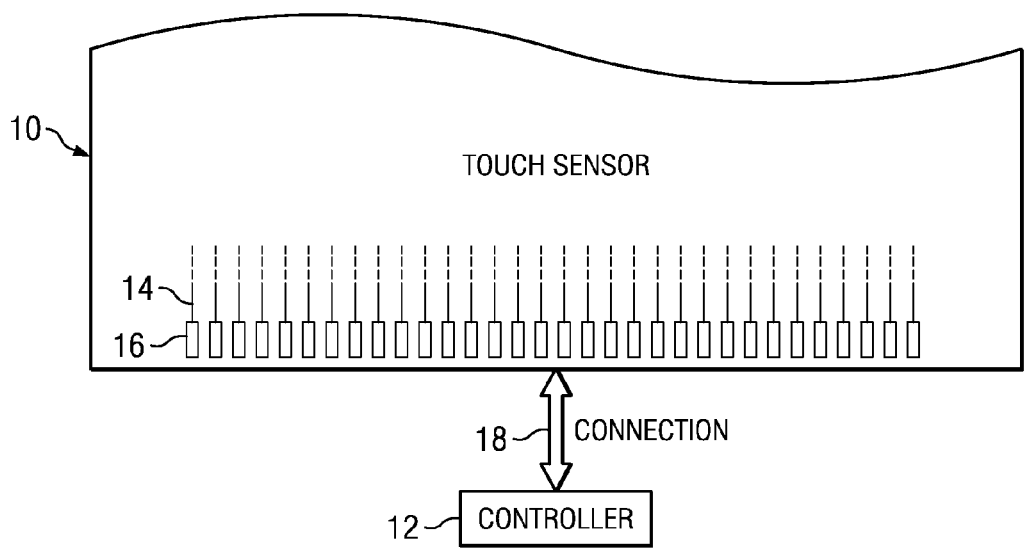
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Particular embodiments of the present disclosure include a dielectric layer providing a protective coating over conductive material formed on a substrate of a stack of a touch sensor 10. The dielectric layer has a low dielectric constant, such as, for example, less than or equal to approximately 3. Further examples of the low dielectric constant of the dielectric layer are discussed in detail below. The dielectric layer may be formed by applying a thin coating of a dielectric material over the substrate and conductive material before they are integrated with the other components of the stack. As an example and not by way of limitation, a dielectric layer may be placed on a bottom surface of a substrate and the conductive material formed on the substrate.

In particular embodiments, the dielectric layer may attenuate noise (such as electro magnetic radiation) generated by an electronic display panel. An electronic display unit typically generates noise that may have a negative effect on the touch sensor. The dielectric layer may attenuate the noise (or a portion of the noise) generated by the electronic display unit, thereby improving the performance of the touch sensor. In particular embodiments, the dielectric layer may also protect the conductive material on the substrate during manufacturing of the touch sensor and thereafter. For example and not by way of limitation, the dielectric layer may protect the conductive material from corrosion (e.g. rust) and/or abrasions. In particular embodiments, the dielectric layer may further keep the conductive lines in place on the substrate.

In traditional systems, a layer of optically clear adhesive and a protective shield layer (such as an ITO shield layer, a PDot (Poly(3,4-ethylenedioxythiophene)) shield layer, a carbon nano tube shield layer, or any other clear conductive layer connected to ground) are laminated to the substrate and conductive material formed thereon. This protective shield layer may act as a shield against noise generated by the electronic display unit when connected to ground. While adding a protective shield layer in-between the sensor substrate (such as the substrate and conductive material forming the drive or sense electrodes of a touch sensor) and the electronic display unit may attenuate noise generated by the electronic display unit and/or protect the conductive material formed on the sensor substrate, such a method involves extra processing steps (such as alignment of the protective shield layer with the substrate and connecting the protective shield layer to ground) and materials that are not necessary if a dielectric layer is used instead. Furthermore, a protective shield layer may be expensive. Additionally, the protective shield layer may also create a ground loading effect which tends to attract electric fields of the touch sensor to the ground layer, thereby decreasing the sensitivity of the touch sensor.

In other traditional systems, in order to attenuate noise generated by an overly noisy electronic display unit, the touch sensor may utilize an air gap in-between the sensor substrate and the electronic display unit (or in-between the protective shield layer and the electronic display unit). The use of such an air gap, however, may decrease transmissivity of light from the electronic display unit because of the large difference between the refractive index of the air and the refractive index of the sensor substrate (or the protective shield layer). In particular embodiments, the dielectric layer having a low dielectric constant may provide better attenuation of the noise from the electronic display unit, thereby allowing the touch sensor to be created without an air gap in-between the dielectric layer and the electronic display unit.

Figure 2A:
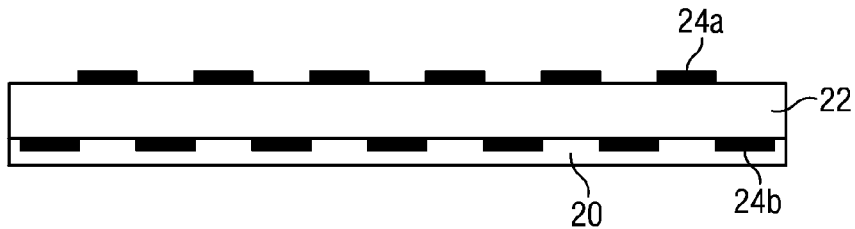
FIG. 2A illustrates an example dielectric layer formed on a bottom surface of a substrate with conductive material forming electrodes.

FIG. 2A illustrates an example dielectric layer 20 formed on a bottom surface of a substrate 22 with conductive material forming electrodes 24. As depicted, dielectric layer 20 is formed over sense electrodes 24b. The dielectric layer 20 on the bottom surface of substrate 22 may overlay and protect any other suitable conductive elements of touch sensor 10, such as sense lines, drive lines, tracks 14, or connection pads 16.

In the embodiment depicted, dielectric layer 20 has a low dielectric constant. In particular embodiments, a low dielectric constant refers to a dielectric constant that is less than or equal to approximately 3. The dielectric layer 20 may have any dielectric constant that is less than or equal to approximately 3. As examples and not by way of limitation, the dielectric layer may have a dielectric constant that is equal to 3, 2.8, 2.7, 2.5, 2.25, 2, 1.75, 1.5, 1.25, 1.1, 1, and/or any other dielectric constant that is less than or equal to approximately 3. In particular embodiments, a low dielectric constant may include any other suitable range of low dielectric constants. As examples and not by way of limitation, a low dielectric constant may include any dielectric constant that is less than or equal to approximately 3 and greater than 1, less than approximately 3 and greater than approximately 2, less than approximately 3 and greater than approximately 2.5, less than approximately 3 and greater than approximately 2.75, less than approximately 3 and greater than approximately 2.85, less than approximately 2 and greater than approximately 1, less than 3 and greater than approximately 2, less than 3 and greater than approximately 2.5, less than 3 and greater than approximately 2.85, or any other suitable range of low dielectric constants. Furthermore, the term "approximately" may refer to minor variations in a dielectric constant. For example and not by way of limitation, "approximately" may refer to variations of the dielectric constant of 0.1 or less. Such variations may be the result of the manufacturing process of the dielectric layer 20.

The dielectric layer 20 may be formed of any suitable material with a low dielectric constant. Furthermore, the dielectric layer 20 may be formed by lowering the dielectric constant of any suitable material type. As an example and not by way of limitation, a material type (such as varnish, shellac, lacquer, PMMA, polycarbonate, or other polymer) may be doped with other compounds in order to lower the dielectric constant of the material type, as would be understood by one of ordinary skill in the art based on the present disclosure.

In the embodiment depicted, dielectric layer 20 forms a substantially flat sheet over substrate 22. That is, the bottom surface of dielectric layer 20 maintains a uniform thickness with respect to the bottom surface of substrate 22. Such embodiments may allow a dielectric layer 20 to interface with other flat elements of a touch sensor stack, such as an electronic display panel. In another embodiment, dielectric layer 20 generally conforms with the shape of substrate 22 and the conductive material formed thereon. For example and not by way of limitation, a portion of the dielectric layer 20 that contacts the bottom surface of substrate 22 may rest higher than another portion of the dielectric layer that overlays a sense electrode 24b that is raised from the surface of the substrate. In such embodiments, each point of the dielectric layer 20 may have a generally constant thickness when measured from the element (e.g. substrate 22 or sense electrode 24b) contacted by the dielectric layer at that point.

The dielectric layer 20 is formed by applying a thin coating of a dielectric material over the substrate 22 and conductive material formed thereon. In particular embodiments, there is no adhesive layer between the dielectric layer 20 and substrate 22 and/or conductive material formed thereon. The dielectric layer 20 may have any suitable thickness, such as between about 0.5 and about 50 microns. In various embodiments, the dielectric layer 20 is less than 10 microns. In a particular embodiment, the dielectric layer 20 is between about 0.5 and about 4 microns. The dielectric layer 20 may include any suitable physical characteristics, such as good adhesion (to substrate 22 and an electronic display unit), durability, and suitable optical properties (e.g. the material should be clear so that the electronic display panel can be viewed through the dielectric layer 20).

The dielectric material may be formed on the substrate 22 and conductive material in any suitable manner. In a particular embodiment, a roll-to-roll process is used to apply the dielectric material to substrate 22 and the conductive material formed thereon. In such an embodiment, a roll may include a plurality of segments that each include a discrete substrate 22 and conductive material. Another roll may include a thin film of dielectric material. The dielectric material from this roll may be laminated or otherwise applied to the segments of the first roll, resulting in the formation of dielectric layers 20 on substrates 22 and the conductive materials formed thereon. In various embodiments, when the dielectric layer 20 is formed on substrate 22 using such a lamination method, dielectric layer 20 has a thickness of about 50 microns.

In some embodiments, the dielectric material is applied in a liquid (or semi-liquid or other malleable) form and allowed to cure (such as a thermal cure or an ultraviolet cure) into a hard protective coating over substrate 22 and the conductive material. Any suitable method may be used to apply the dielectric material to the substrate 22. For example and not by way of limitation, the dielectric material may be screen printed on the substrate 22 and the conductive material. As another example and not by way of limitation, a roller or brush may be used to coat the dielectric material on the substrate 22 and conductive material. As another example and not by way of limitation, the substrate 22 and conductive material may be immersed in and then removed from a pool of the dielectric material. As yet other examples and not by way of limitation, the dielectric material may be sprayed, poured, or inkjet printed onto substrate 22 and the conductive material. In various such embodiments, dielectric layer 20 has a thickness between about 2 microns and about 50 microns.

The dielectric layer 20 may be formed at any suitable time during manufacturing of touch sensor 10. For example and not by way of limitation, the dielectric layer 20 may be formed immediately or soon after the conductive material is formed on substrate 22. In particular embodiments, a series of substrates may be processed in succession. Conductive material is formed on one substrate, a dielectric layer is then formed on that substrate, conductive material is formed on the next substrate, a dielectric layer is formed on that substrate, and so on. Such a method may be relatively fast and inexpensive compared to other solutions where a layer of adhesive and other component (such as a protective carrier or dielectric layer) has to be aligned with and applied to the substrate. Once the dielectric layer 20 is formed, it protects against corrosion (e.g. rust) of the conductive material that can occur if the substrate and conductive material is exposed to moisture or other corrosion facilitating material.

Figure 2B:
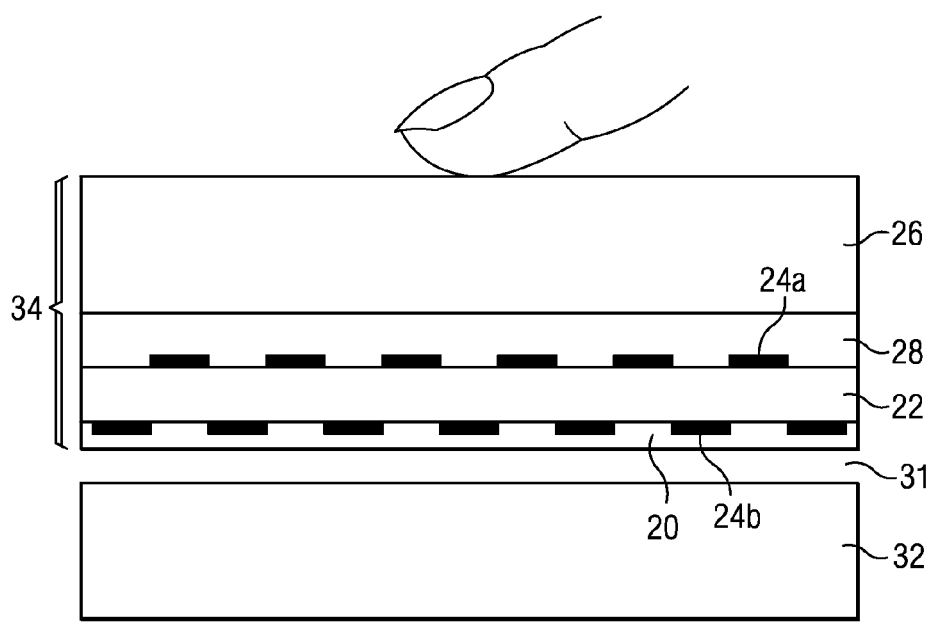
FIG. 2B illustrates an example stack of a touch sensor that incorporates the dielectric layer of FIG. 2A.

FIG. 2B illustrates an example stack 34 of touch sensor 10 that incorporates the dielectric layer 20 of FIG. 2A. Stack 34 includes electrodes 24 formed on substrate 22, a cover panel 26 coupled to substrate 22 via a layer of adhesive 28, and dielectric layer 20 applied to the bottom surface of substrate 22 and conductive material formed thereon. In particular embodiments, there is no adhesive layer between the dielectric layer 20 and substrate 22 and/or electrodes 24 formed thereon. The dielectric layer 20 is configured to interface with electronic display panel 32. For example and not by way of limitation, as depicted, the dielectric layer 20 may face electronic display panel 32 with an air gap 31 between dielectric layer 20 and electronic display panel 32. In such embodiments, the dielectric layer may be sufficiently thick (e.g. greater than or equal to about 2 microns) and smooth such that visual interference effects (such as rainbow effects) are avoided or mitigated. As another example and not by way of limitation, the dielectric layer 20 may be in direct contact with electronic display panel 32 (such as when the dielectric layer 20 is a liquid optically clear adhesive (LOCA), a low dielectric constant OCA, or any other suitable adhesive). In such an example, there is no air gap in-between the dielectric layer 20 and the electronic display panel 32. Electronic display panel 32 may be a liquid crystal display (LCD), light emitting diode (LED) display, or other suitable electronic display.

Figure 3:
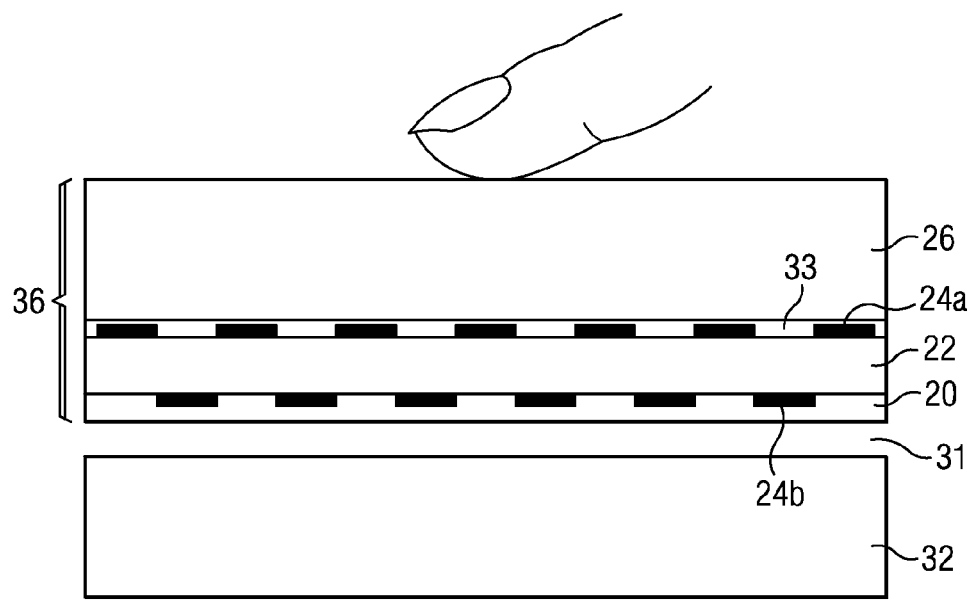
FIG. 3 illustrates an example stack of a touch sensor that incorporates the dielectric layer of FIG. 2A, and further incorporates an example dielectric layer formed on the top of a substrate.

FIG. 3 illustrates an example stack 36 of a touch sensor that incorporates the dielectric layer of FIG. 2A, and further incorporates an example dielectric layer formed on the top of a substrate. Stack 36 includes electrodes 24 formed on substrate 22, dielectric layers 20 and 33 formed on the bottom and top surfaces of substrate 22 and the electrodes 24, and a cover panel 26 formed over dielectric layer 33.

The dielectric layer 20 of FIG. 3 may have any of the characteristics described above in connection with the dielectric layer 20 of FIGS. 2A and 2B. Furthermore, the dielectric layer 20 may be formed of any of the materials described above in connection with the dielectric layer 20 of FIGS. 2A and 2B, and further may be formed by any of the methods described above in connection with the dielectric layer 20 of FIGS. 2A and 2B. The dielectric layer 20 is configured to interface with electronic display panel 32. For example and not by way of limitation, as depicted, the dielectric layer 20 may face electronic display panel 32 with an air gap 31 between dielectric layer 20 and electronic display panel 32. As another example and not by way of limitation, the dielectric layer 20 may be in direct contact with electronic display panel 32 (as is discussed above). In such an example, there is no air gap in-between the dielectric layer 20 and the electronic display panel 32. As a further example, the dielectric layer 20 may be in indirect contact with electronic display panel 32 (such as when an OCA connects dielectric layer 20 to electronic display panel 32).

As depicted, dielectric layer 33 is formed over drive electrodes 24a. In particular embodiments, there is no adhesive layer between the dielectric layer 33 and substrate 22 and/or drive electrodes 24a formed thereon. The dielectric layer 33 may also overlay and protect any other suitable conductive elements of touch sensor 10, such as sense electrodes 24b, drive lines, sense lines, tracks 14, or connection pads 16. In particular embodiments, because dielectric layer 33 is formed on the top side of substrate 22, dielectric layer 33 may have a higher dielectric constant than dielectric layer 20. As an example and not by way of limitation, although dielectric layer 20 may have a dielectric constant that is less than or equal to approximately 3, dielectric layer 33 may have a dielectric constant that is greater than 3. In particular, the dielectric layer 33 may have a dielectric constant that is less than or equal to approximately 4 and greater than 3. In particular embodiments, the higher dielectric constant of dielectric layer 33 may prevent dielectric layer 33 from adversely affecting touch sensor 10. In particular embodiments, dielectric layer 33 may only overlay and protect tracks 14 on the top side of substrate 22. In such embodiments, dielectric layer 33 may have a dielectric constant that is less than or equal to approximately 3.

The dielectric layer 33 may be formed of any suitable material. Examples of suitable materials for forming dielectric layer 33 include varnish, shellac, lacquer, PMMA, or polycarbonate. In particular embodiments, the dielectric material may be chosen to index match the material of the cover panel. This may include choosing a dielectric material with optical properties that are similar to optical properties of the cover panel in order to minimize visual distortions (such as rainbow effects) that can arise from dissimilarities between the cover panel and the dielectric layer 33. In one embodiment, index matching is achieved by forming a dielectric layer 33 made of the same material as the cover panel. For example and not by way of limitation, the dielectric layer 33 may be made of PMMA and the cover panel formed by injecting PMMA resin during an in-mold lamination (IML) process.

The dielectric layer 33 may be formed in any suitable manner, such as that described above in connection with dielectric layer 20. In particular embodiments, dielectric 33 may be formed using a process that is different from a process used to form dielectric layer 20. As an example and not by way of limitation, dielectric layer 33 may be formed by a roll-to-roll process and dielectric layer 20 may be formed by a screen printing process. In other embodiments, dielectric layers 20 and dielectric layer 33 may be formed using the same process.

In particular embodiments, the dielectric layer 33 may include any of the physical characteristics described above in connection with dielectric layer 20. For example and not by way of limitation, the dielectric layer 33 may include good adhesion (to substrate 22), durability, and suitable optical properties (e.g. the material should be clear so that the electronic display panel can be viewed through the dielectric layer 33). As another example and not by way of limitation, dielectric layer 33 may form a substantially flat sheet over the substrate 22 or may generally conform with the shape of the substrate 33 and conductive material formed thereon (such as drive electrodes 24a).

Although example stack configurations have been shown, dielectric layer 33 may be applied within a stack of a touch sensor 10 in any suitable manner. As examples and not by way of limitation, dielectric layer 33 may be applied to the top surface of multiple substrates, to the bottom surface of multiple substrates, or both.

In particular embodiments, the dielectric layer (such as dielectric layer 20 and/or dielectric layer 33) is applied to only a portion of a surface of substrate 22. As an example and not by way of limitation, the dielectric layer may be omitted from the area of the substrate 22 on which the connection pads 16 are formed, so as not to interfere with coupling between controller 12 and the connection pads. In other embodiments, the dielectric layer is applied to the portion of substrate 22 that includes the connection pads 16, but portions of the dielectric layer are subsequently removed from the connection pads 16 in order to expose at least a portion of the connection pads 16. Portions of the dielectric layer may be removed in any suitable manner, such as through application of a solvent. In yet other embodiments, the dielectric layer may be applied to the portion of substrate 22 that includes the connection pads 16, but the dielectric layer is sufficiently thin (e.g. about 0.5-4 microns) to allow ACF to penetrate through the dielectric layer 20 during bonding between the connection pads 16 and an FPC.

Figure 4:
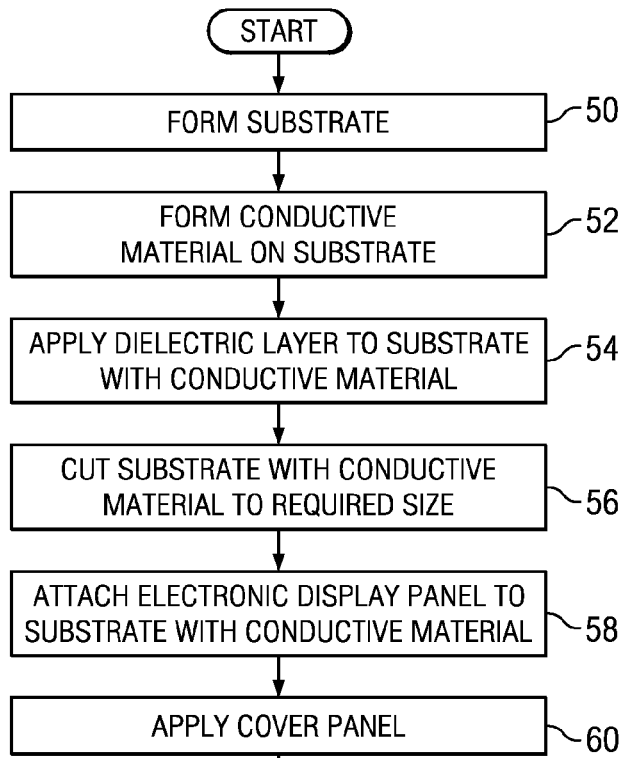
FIG. 4 illustrates an example method for forming a stack of a touch sensor with a dielectric layer.

FIG. 4 illustrates an example method for forming a stack of a touch sensor 10 with a dielectric layer 20. The method begins as substrate 22 is formed at step 50. Substrate 22 may be formed in any suitable manner and, as discussed earlier, may comprise PET. At step 52, conductive material is formed on substrate 22. The conductive material may be formed on any suitable surface of the substrate 22. Any suitable conductive elements may be formed from the conductive material, such as tracks 14, connection pads 16, drive electrodes 24a, sense electrodes 24b, drive lines, or sense lines. The conductive elements may be made of any suitable material such as FLM, ITO, or carbon nanotubes.

At step 54, a dielectric layer 20 is applied to the substrate 22 with the conductive material. The dielectric layer 20 has a low dielectric constant. In particular embodiments, the dielectric layer 20 may have any dielectric constant that is less than or equal to approximately 3, such as a dielectric constant that is equal to 3, 2.8, 2.7, 2.5, 2.25, 2, 1.75, 1.5, 1.25, 1.1, 1, and/or any other dielectric constant that is less than or equal to approximately 3. The dielectric layer 20 may be formed over any suitable portion or all of one or more surfaces of the substrate 22.

At step 56, the substrate 22 is cut to the desired size. The substrate may be cut in any suitable manner. At step 58, an electronic display panel 32 is attached to the substrate 22. The electronic display panel 32 may be attached in any suitable manner. In particular embodiments, the electronic display panel 32 may be attached to the substrate 22 such that the dielectric layer 20 may face electronic display panel 32 with an air gap 31 between dielectric layer 20 and electronic display panel 32. In particular embodiments, the electronic display panel 32 may be attached to the substrate 22 such that the dielectric layer 20 may be in direct contact with the electronic display panel 32. In such embodiments, there is no air gap in-between the dielectric layer 20 and the electronic display panel 32. In particular embodiments, the electronic display panel 32 may be attached to the substrate 22 such that the dielectric layer 20 may be in indirect contact with the electronic display panel 32 (such as when an OCA connects the dielectric layer 20 to the electronic display panel 32).

At step 60, cover panel 26 is applied to the substrate 22 or another substrate in the stack. In particular embodiments, a separately manufactured cover panel 26 is applied to the top surface of the substrate via an adhesive layer 28 or dielectric layer 33. In other embodiments, the cut substrate 22 is presented to an IML tool and the cover panel 26 is formed over a dielectric layer 33 on the top surface of the substrate.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Although FIGS. 1-4 have been described above as including particular components and/or steps, the systems and methods of FIGS. 1-4 may include any combination of any of the described components and any of the options, features, or steps described herein, as would be understood by one of ordinary skill in the art based upon the teachings of the disclosure. For example and not by way of limitation, any of the options, features, or steps described herein may be utilized in combination with the illustrated embodiments of FIGS. 1-4 and/or any number of the other options, features, or steps also described herein as would be understood by one of ordinary skill in the art based upon the teachings of the disclosure.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
    a substrate comprising a first surface configured to face toward an electronic display panel when coupled to the electronic display panel;
    a plurality of first electrodes comprising one or more conductive materials on the first surface; and
    a dielectric layer formed over the first electrodes and at least a portion of the first surface, the dielectric layer having a dielectric constant less than or equal to approximately 3 and being configured to face toward the electronic display panel when coupled to the electronic display panel.

2. The touch sensor of claim 1, wherein the dielectric layer is configured to face the electronic display panel with an air gap between the dielectric layer and the electronic display panel.

3. The touch sensor of claim 1, wherein the dielectric layer is in at least indirect contact with an electronic display panel.

4. The touch sensor of claim 1, wherein there is no adhesive layer between the dielectric layer and the first electrodes.

5. The touch sensor of claim 1, further comprising:
   a plurality of second electrodes comprising one or more conductive materials on a second surface of the first substrate or a second substrate;
   a second dielectric layer formed on the second electrodes and at least a portion of the second surface; and
   a substantially transparent cover panel disposed on the dielectric layer.

6. The touch sensor of claim 1, wherein the conductive materials comprise indium tin oxide, a plurality of fine lines of metal, or a plurality of carbon nanotubes.

7. The touch sensor of claim 1, wherein the dielectric constant of the dielectric layer is less than approximately 2 and greater than approximately 1.

8. The touch sensor of claim 1, wherein the dielectric constant of the dielectric layer is less than approximately 3 and greater than approximately 2.

9. A device comprising:
   a touch sensor comprising:
      a substrate comprising a first surface configured to face toward an electronic display panel when coupled to the electronic display panel;
      a plurality of first electrodes comprising one or more conductive materials on the first surface; and
      a dielectric layer formed over the first electrodes and at least a portion of the first surface, the dielectric layer having a dielectric constant less than or equal to approximately 3 and being configured to face toward the electronic display panel when coupled to the electronic display panel; and
   one or more computer-readable non-transitory storage media coupled to the touch sensor and embodying logic that is configured when executed to control the touch sensor.

10. The device of claim 9, wherein the dielectric layer is configured to face the electronic display panel with an air gap between the dielectric layer and the electronic display panel.

11. The device of claim 9, wherein the dielectric layer is in at least indirect contact with an electronic display panel.

12. The device of claim 9, wherein there is no adhesive layer between the dielectric layer and the first electrodes.

13. The device of claim 9, wherein the touch sensor further comprises:
   a plurality of second electrodes comprising one or more conductive materials on a second surface of the first substrate or a second substrate;
   a second dielectric layer formed on the second electrodes and at least a portion of the second surface; and
   a substantially transparent cover panel disposed on the dielectric layer.

14. The device of claim 9, wherein the conductive materials comprise indium tin oxide, a plurality of fine lines of metal, or a plurality of carbon nanotubes.

15. The device of claim 9, wherein the dielectric constant of the dielectric layer is less than approximately 2 and greater than approximately 1.

16. The device of claim 9, wherein the dielectric constant of the dielectric layer is less than approximately 3 and greater than approximately 2.

17. A method for forming a touch sensor, the method comprising:
   providing a substrate comprising a first surface configured to face toward an electronic display panel when coupled to the electronic display panel;
   forming a plurality of first electrodes comprising one or more conductive materials on the first surface; and
   forming a dielectric layer on the first electrodes and at least a portion of the first surface, the dielectric layer having a dielectric constant less than or equal to approximately 3 and being configured to face toward the electronic display panel when coupled to the electronic display panel.

18. The method of claim 17, further comprising attaching the electronic display panel to the substrate such that the electronic display panel faces the dielectric layer, with an air gap disposed between the dielectric layer and the electronic display panel.

19. The method of claim 17, further comprising attaching an electronic display panel to the substrate such that the dielectric layer is in at least indirect contact with the electronic display panel.

20. The method of claim 17, wherein the dielectric constant of the dielectric layer is less than approximately 2 and greater than approximately 1.

* * * * *